United States Patent [19]
Bombardier et al.

[11] 3,756,667
[45] Sept. 4, 1973

[54] SUSPENSION FOR TRACKED VEHICLES

[75] Inventors: Jerome Bombardier; Jules Perreault, both of Valcourt, Quebec, Canada

[73] Assignee: Bombardier Limited, Valcourt, Quebec, Canada

[22] Filed: Nov. 23, 1971

[21] Appl. No.: 201,321

[30] Foreign Application Priority Data

Jan. 21, 1971 Canada .......................... 103330

[52] U.S. Cl. .................................. 305/24, 180/5 R
[51] Int. Cl. ...................... B62d 55/10, B62m 27/02
[58] Field of Search ...................... 180/5 R; 305/24, 305/25, 27

[56] References Cited
UNITED STATES PATENTS

| | | | |
|---|---|---|---|
| 3,684,043 | 8/1972 | Hirsh | 180/5 R |
| 3,658,392 | 4/1972 | Perreault | 305/27 |
| 3,613,810 | 10/1971 | Hetteen | 180/5 R |
| 3,528,520 | 9/1970 | Aaron | 180/5 R X |
| 3,692,130 | 9/1972 | Stacy | 180/5 R |

*Primary Examiner*—Richard J. Johnson
*Attorney*—Larson, Taylor & Hinds

[57] ABSTRACT

This invention relates to a suspension system for snowmobiles or like vehicles utilizing a resilient biased support for an endless track. The suspension system includes at least two laterally spaced longitudinally coextensive slide units, each said unit having front and rear pivotally interconnected skates. Superposed each unit is a leaf spring connected at its ends to a front and rear skate. Trasnverse mounting means is provided for attaching the system to the vehicle chassis.

10 Claims, 3 Drawing Figures

PATENTED SEP 4 1973 3,756,667

SUSPENSION FOR TRACKED VEHICLES

SUMMARY OF INVENTION

In applicant's copending U. S. Application, Ser. No. 76,209 filed Sept. 28, 1970 now U.S. Pat. No. 3,658,392 which is a streamlined continuation of application Ser. 794,628 filed Jan. 24, 1969 now abandoned, a suspension system of the "slider type" is disclosed. In this application at least two spaced parallel skids or slide units are provided and which extend along a substantial portion of the length of the ground engaging surface of the endless track. Each slide unit consists of two skid members or skates articulated one to the other in an end-to-end relationship. The skates are free to move relative to the chassis of the vehicle in a plane parallel to the length of the track. A plurality of spring biased supporting arm aseemblies are positioned at different spaced apart regions along the slide units providing a resilient bias between the chassis and the slide units.

According to the present invention, all the desired attributes gained by applicant's prior articulated "slider" suspension have been retained, with considerable production cost saving, improved ease of manufacture and less maintenance requirements.

The principle feature of the present invention is to provide a simplified, rugged, articulated "slider" suspension for tracked vehicles which comprises at least two laterally spaced longitudinally co-extensive slide units, each said unit having front and rear pivotally interconnected skates, at least two laterally spaced and longitudinally co-extensive leaf springs superposed at least two of said slide units, each of said leaf springs being connected at its end to a front and rear skate, and mounting means for securing said leaf springs intermediate their ends to the vehicle chassis.

The use of leaf springs to impart the biasing support between the slide units and the chassis of the vehicle permits a further utilization of leaf springs already used in connecting the leading skis of the snowmobile to the ski legs. Further, the same type of connecting means used in joining the ski leaf springs to the skis can be used in the novel suspension assembly. Each suspension leaf spring may be fixedly connected at one of its ends to one of the skates and slidably connected at its other end to the other skate.

Idle wheels functioning as front track guiding means for introducing the endless track delivered from the drive sprocket or sprockets to the suspension are not essential provided the leading portion of the front skates are upwardly curved. Actively, idle wheels may be employed in combination with upwardly curved skates or with skates which are not so curved.

The system may further provide for increased load resistance past a given spring deflection by means of an auxiliary spring leaf for each main spring assembly. Preferably, the auxiliary spring leaves are operably positioned beneath and centrally connected to each main leaf spring. Being of the same type of spring metal as the main spring, the auxiliary spring member or secondary spring member is designed so that it engages a slide unit when the system is subjected to overload. Upon overload, a substantial percentage of impact force is resiliently transmitted via the secondary springs from the slide units to the vehicle chassis thereby minimizing "bottoming" of the suspension. The end result is a relatively flexible suspension system which provides increased spring resistance at high speeds and/or when subjected to rough terrain conditions.

BRIEF DESCRIPTION OF DRAWINGS

In drawings which illustrate certain embodiments of the invention by way of example only.

With reference to the accompanying drawings, FIG. 1 illustrates a suspension arrangement for supporting a snowmobile chassis 10 upon the lower ground engaging portion of an endless track 12. Track 12 is entrained about one or more drive sprockets 14 rotatably mounted on chassis 10 and one or more idle sprocket 16 also rotatably connected to the chassis 10 by means of spring biased pivotable side or link plates 18. The suspension arrangements as shown in FIGS. 1 and 2 comprise two laterally spaced slide units 20 and 22. Each unit includes front skates 24 and rear skates 26. Skates 24 and 26 are arranged in an end-to-end fashion and are articulated one to the other about pivot 28. Leaf springs 36 resiliently support slide units 20 and 22 to the vehicle's frame 10 as discussed hereinbelow. Each skate is preferably provided with a wear blade 29 of high molecular weight polyethylene.

Figure 1:
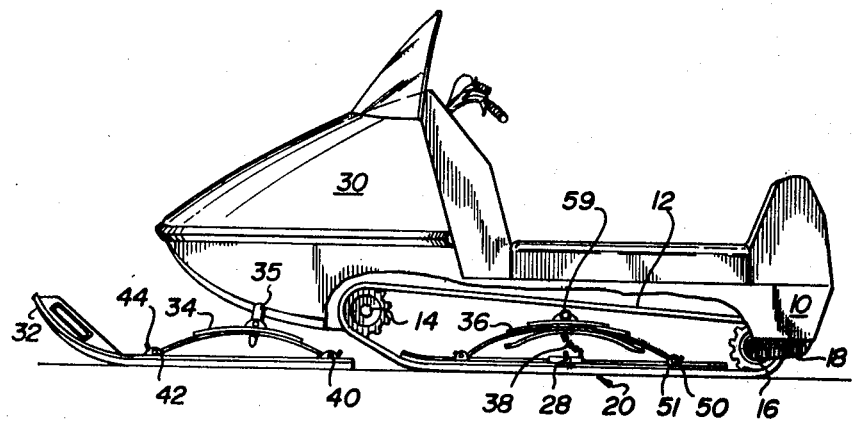
FIG. 1 is a side view of a slide suspension utilizing leaf springs as installed on a snowmobile. A portion of the chassis has been omitted for the sake of clarity.

From FIG. 1, it will be seen that the front portion of the snowmobile 30 is supported by one or more front steerable skis 32 connected to ski leaf springs 34 which in turn are pivotally seucred to steering ski legs 35 extending below the chassis 10. The ski leaf spring, formed from several leaves in a conventional manner, is connected at its trailing end to the ski by means of a transverse pin 40 about which the end of the spring is bent facilitating pivotal action. The forward end of the ski leaf spring, however, is not bent about itself but rather extends under transverse pin 42 and then extends upwardly at 44 to form a stop. Stop 44 prevents the forward portion of ski leaf spring 34 from disengaging itself from ski 32 while still permitting relative sliding action between ski 32 and the leading portion of the ski leaf spring.

The connecting principle of the ski and its associated leaf spring can also be used in connecting the leaf springs of the suspension to the slide units 20 and 22. The suspension leaf springs 36 are slidably connected to skates 24 by transverse pins 46 extending across mounting plates 48 welded to the skates. The rear of the suspension leaf springs are pivotally connected to rear skates 26 by being curled around transverse bracer 50 which extends through rear mounting plates 51 in the manner shown in FIGS. 2 and 3. Transverse bracer 50 also serves to maintain the rear skates at their predetermined spacing just as does transverse bracer 54 of FIG. 2 or bracer 55 of FIG. 3.

Figure 2:
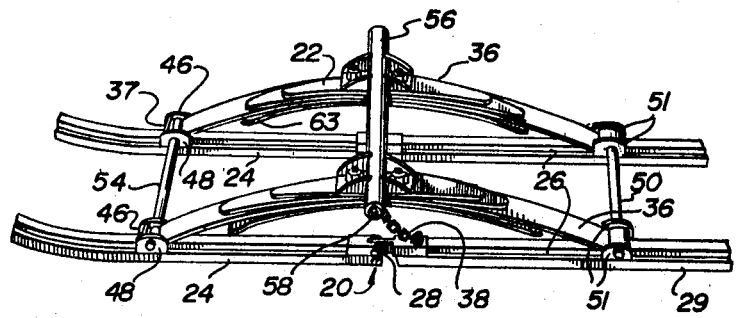
FIG. 2 is a perspective view of the slide suspension shown in FIG. 1.

In the embodiment illustrated in FIGS. 1 and 2, a transverse member 56 shown as a hollow sleeve is positioned intermediate the ends of opposed leaf springs 36 and fixedly secured thereto. As evident from FIG. 2, mounting shaft 58 extends through sleeve 56 which is in turn pivotally connected to chassis 10. This permits pivotal action of the assembly about shaft 58 and renders the assembly easy to remove merely by unscrewing attachment bolts 59.

Figure 3:
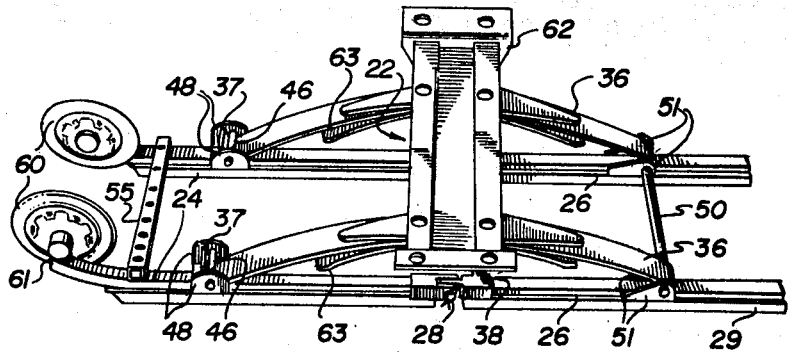
FIG. 3 is a perspective view of an alternative form of slide suspension from that shown in FIGS. 1 and 2.

The forward portion of skates 24 may be provided with idler wheels 60 mounted thereon by means of axles 61 as shown in FIG. 3. This reduces the frictional wear experienced by the high density plastic blade 29 on the front skates engaging with the metal cleats positioned between the sprocket holes of the endless track (not shown). However, for high speed operation it has been found sufficient to make the leading end of each slider slightly upwardly curved as best seen in FIGS. 1 and 2. The front skate is capable of assuming an inclined position due to its pivotal connection with the rear skate. Additionally, the track tends to bulge as it is pushed off the drive sprockets and thereby complements the forward upward curvature of the front skates.

Referring now to FIG. 3, transverse mounting member 62 is fixedly connected to leaf springs 36 intermediate their ends. Transverse member 62 is also adapted to be fixedly attached to chassis 10.

In operation, it will be seen that the assembly illustrated in FIG. 2 is pivotal about shaft 58. When leading skates 24 encounter a bump, the unit may pivot in a clockwise direction as viewed in FIG. 2. The impact encountered forces the leading portion 37 of springs 36 to move forwardly along skates 24 under the constraining influence of transverse pins 46. After impact, the springs return to the natural position indicated in FIG. 2 with the leading portions 37 abutting transverse pins 46.

Assuming the impact is an abrupt one, as the vehicle proceeds over it, skates 24 and 26 articulate about pivot 28. As the forward motion of the vehicle continues, the assembly, as a unit, pivots in a counterclockwise direction. It will be apparent that in operation, there is a certain amount of pivotal action of leaf spring 36 about transverse pin 50 at the rear of the assembly as well as at the front of the assembly at the connection of leaf spring 36 with leading skates 24.

The assembly of FIG. 3 functions in a similar manner to that of FIG. 2. However, springs 36 are not permitted to pivot as a unit about their connection with the chassis. In both embodiments, however, the function of the two is identical if a flat upward impact (compression) is encountered along the slide units. Leaf spring 36 is constrained for forward movement along skates 24 while its rear connection pivots about transverse shaft 50 on skate 26 moving the slide units rearwardly.

It has been found that the preferred anchoring or connecting point of the leaf springs 36 to the slide units 20 or 22 is just slightly forward of the mid-point of front skate 24 and slightly rear of the mid-point of rear skate 26. Due to the central articulation of skates 24 and 26, improper positioning of the connection between springs 36 and skates 24 and 26 tends to unduly wear blades 29, particularly in the proximity of pivot 28. Means to limit the extent of articulation between end-to-end skates 24 and 26 may also be provided. It has been found that when the suspension system is unloaded, for example, when the snowmobile is air-borne or the rear of the vehicle is lifted for tuning purposes, the skates extend downwardly about pivot 28 causing considerable vibration due to excessive pressure between the track and the middle region of the articulated skates. This problem has been practically overcome by the use of limit chains 38 connecting slide units 20 and 22 near their point of articulation to transverse member 56 of FIG. 2 or 62 of FIG. 3. While other limit means may be used, chains 38 adequately restrain the downward articulation of the skates at pivot 28 to define limit.

Excessive compression or shock loads (overloads) are taken up by auxiliary spring members 63 positioned on the underside of leaf springs 36. Springs 63, formed of the same spring metal as springs 36 and secured thereto, slidably engage the upper surface of skates 24 and 26 and effectively increase the downward spring bias on the slat units. The use of auxiliary springs materially reduces the risk of "bottoming" in situations where extreme load conditions prevail. In operation the auxiliary springs only come into play after the main springs 36 have undergone a predetermined initial deflection. This permits the production of a suspension which is very soft for light loading, i.e. when travelling at normal speeds over generally even ground. However, the auxiliary springs come into play at high speeds and/or over rough terrain when deflection is resisted by both sets of springs.

What we claim as our invention is:

1. A suspension system for the resilient biased sliding support of an endless track on a vehicle chassis, comprising two laterally spaced longitudinally co-extensive slide units, each said unit having front and rear pivotally interconnected skates, two laterally spaced and longitudinally co-extensive leaf springs positioned above respective ones of said slide units, each of said leaf springs being connected at its respective ends to a front and rear skate, and mounting means for securing said leaf springs intermediate their ends to the vehicle chassis, such that said leaf springs form the sole means for connecting said slide units to the vehicle chassis.

2. The suspension as claimed in claim 1, wherein said front skates include track guiding means and wherein said leaf springs are fixedly connected to said rear skates and slidably connected to said front skates.

3. The suspension as claimed in claim 2, wherein said leaf springs are connected to said front skates slightly forward of their mid-point and to said rear skates slightly rearward of their mid-point.

4. The system as claimed in claim 1 wherein said mounting means comprises a transverse mounting member which is fixedly attached to said leaf springs and adapted to be fixedly mounted to the vehicle chassis.

5. A suspension system as claimed in claim 1, wherein said mounting means comprises a transverse mounting member which is fixedly attached to said springs and adapted to be pivotably mounted to the vehicle chassis.

6. A suspension system as claimed in claim 1, wherein said track guiding means comprises upwardly curved front leading portions on said front skates.

7. A suspension system as claimed in claim 1, wherein said track guiding means comprises a pair of forwardly positioned track guiding idle wheels, each of said wheels being attached to, but positioned slightly to the fore and to one side of a front skate.

8. The system as claimed in claim 1, wherein said leaf springs each include an auxiliary spring member positioned below said leaf spring and extending longitudinally therewith.

9. The system as claimed in claim 1, wherein said front skates and rear skates are each held in spaced relation by means of transverse bracers.

10. The system as claimed in claim 1, including means for limiting the degree of downward articulation of said skates relative to said chassis.

* * * * *